(12) United States Patent
Schmid

(10) Patent No.: US 12,181,626 B2
(45) Date of Patent: Dec. 31, 2024

(54) PULSED NEUTRON MONITORING OF CARBON DIOXIDE IN RESERVOIRS

(71) Applicant: Weatherford Technology Holdings, LLC, Houston, TX (US)

(72) Inventor: Gregory Schmid, Sugar Land, TX (US)

(73) Assignee: Weatherford Technology Holdings, LLC, Houston, TX (US)

(*) Notice: Subject to any disclaimer, the term of this patent is extended or adjusted under 35 U.S.C. 154(b) by 220 days.

(21) Appl. No.: 18/153,463

(22) Filed: Jan. 12, 2023

(65) Prior Publication Data

US 2024/0241284 A1   Jul. 18, 2024

(51) Int. Cl.
*G01V 5/10* (2006.01)

(52) U.S. Cl.
CPC .................... *G01V 5/102* (2013.01)

(58) Field of Classification Search
CPC ............... G01V 5/102; G01V 5/101
See application file for complete search history.

(56) References Cited

U.S. PATENT DOCUMENTS

| | | | |
|---|---|---|---|
| 8,471,197 B2 | 6/2013 | Inanc et al. | |
| 9,995,842 B2 | 6/2018 | Zhou | |
| 10,001,582 B2 | 6/2018 | Zhou | |
| 10,379,253 B2 | 8/2019 | Zhou et al. | |
| 11,048,015 B2 | 6/2021 | Schmid et al. | |
| 2013/0048849 A1* | 2/2013 | Li | G01V 5/101 250/269.8 |
| 2014/0001350 A1* | 1/2014 | Beekman | G01V 5/102 250/269.6 |
| 2017/0329041 A1 | 11/2017 | Zhang et al. | |

OTHER PUBLICATIONS

Li, Hui-Geng et al., "A New Measurement of Evaluating Gas or $CO_2$ in Formation—Fast Neutron Cross Section," The 25th Formation Evaluation Symposium of Japan, Sep. 25-26, 2019, 10 pages.
Quintero, Luis F., Ph.D., et al., "Characterization of Pulsed Neutron Responses to Monitor CCUS Projects," SPWLA 63$^{rd}$ Annual Logging Symposium, Jun. 10-15, 2022, 20 pages.
International Search Report and Written Opinion regarding corresponding PCT Application No. PCT/US2023/078522, mailed Feb. 5, 2024.

* cited by examiner

*Primary Examiner* — David P Porta
*Assistant Examiner* — Mamadou Faye
(74) *Attorney, Agent, or Firm* — Lewis & Reese, PLLC

(57) ABSTRACT

Methods, tools, and systems for determining $CO_2$ saturation in a porous formation using pulsed neutron logging are described. Embodiments of a pulsed neutron logging tool feature a pulsed neutron generator configured to emit pulsed neutrons into the formation and at least two detectors configured to receive emitted photons. The first detector is located closer to the neutron generator than the second detector. Embodiments of the method involve determining first detector formation capture counts indicative of neutron capture photons originating from the formation and detected at the first detector, determining second detector borehole capture counts indicative of neutron capture photons originating from the borehole and detected at the second detector, using the first detector formation capture counts and the second detector borehole capture counts to estimate the saturation of $CO_2$ in the formation.

20 Claims, 8 Drawing Sheets

PULSED NEUTRON MONITORING OF CARBON DIOXIDE IN RESERVOIRS

FIELD OF THE INVENTION

The present application relates to logging of boreholes in porous underground formations (reservoirs), and more particularly, to pulsed-neutron measurements to determine carbon dioxide ($CO_2$) saturation in the reservoirs relative to other formation fluids that may be present.

INTRODUCTION

An increasing number of applications are calling for $CO_2$ saturation measurements in earth formations such as hydrocarbon reservoirs and saline aquifers. For example, in addition to $CO_2$ flood monitoring applications, solutions are also needed for non-condensable gas (NCG) detection in steam assisted gravity drainage (SAGD) applications and also $CO_2$ monitoring in carbon capture and sequestration (CCS) projects. All of these applications require good contrast between $CO_2$ formation fluid and other formation fluids, especially oil, $CH_4$ gas and saltwater (SW).

Pulsed neutron logging is a proven method to differentiate oil, gas, and saltwater in petroleum reservoirs. FIG. 1 illustrates a section of a wellbore 100 extending into a formation 101. The illustrated wellbore 100 is stabilized by a casing 103 held against the formation 101 by cement 104. The casing fluid can be oil, gas, saltwater, $CO_2$, or other fluids. Note that the methods and tools described in this disclosure are not limited to cased wellbores and may be used in open hole applications as well. The tubing 102 contains the logging tool 105. The tubing fluid can be oil, gas, saltwater, $CO_2$, or other fluids. Note that the methods and tools described in this disclosure are not limited to wellbores with tubing and may be used in applications without tubing as well.

During operation, a pulsed neutron logging tool 105 is lowered into the tubing 102 using a wireline 106. The pulsed neutron logging tool 105 includes a neutron generator nG, and one or more gamma-ray detectors, labeled here as PD (prox detector), ND (near detector), FD (far detector), and LD (long detector) in FIG. 1. Note that the methods and tools described in this disclosure are not limited to logging tools with four detectors and can be used in any tool with two detectors or more. Even a tool with one detector can apply at least some of the techniques discussed herein. During a pulsed neutron measurement, the neutron generator nG generates neutrons, which are released from the pulsed neutron logging tool 105 at about 14 MeV. The neutrons are represented as straight arrows labeled n in FIG. 1. The high-energy neutrons can undergo a variety of interactions with matter in the tubing 102, the casing 103, the cement 104, the formation 101, and also the fluids in the tubing and casing.

FIG. 2 illustrates three types of such interactions. One possible interaction is an elastic collision, also called elastic scattering, between a neutron n and a nucleus. In the illustrated example, the neutron n collides with a hydrogen nucleus, which consists of a single proton p. Hydrogen is omnipresent in most formations due to the pore spaces typically being filled with liquid or gaseous hydrocarbons or water. In the elastic scattering process, the neutron n imparts some of its energy to the proton p, causing the proton to gain energy and the neutron to lose energy (i.e., to slow down). Hydrogen has a low molecular weight and absorbs a large fraction of the neutron energy in each scattering, thereby playing a major role in the slowing down of fast neutrons. It is well known in the art that the liquid-filled porosity can be inferred by measuring the slowing down distance of fast neutrons.

In an inelastic collision, also called inelastic scattering, a neutron collides with a nucleus, imparting a portion of the neutron's energy to the nucleus. The neutron exits the collision with less energy than before. The energy that is transferred to the nucleus excites the nucleus, which subsequently emits a gamma (Y) photon when the nucleus relaxes. Nuclei of different atoms emit gamma photons having different energies. Therefore, the energy of the emitted gamma photon is indicative of the type of nucleus involved in an inelastic collision.

Notice that both elastic and inelastic scattering cause neutrons to lose energy. After a high energy neutron has undergone a number of collisions, its energy will be reduced. Neutrons having an energy above approximately 1 MeV are considered fast neutrons. Fast neutrons can trigger gamma rays due to inelastic scattering, as described above. Neutrons that are slowed to about 0.4 to 100 eV are considered "epithermal neutrons" and neutrons that are slowed to about 0.025 eV are referred to as "thermal neutrons." Epithermal and thermal neutrons can participate in a third type of interaction whereby the thermal neutron is "captured" by the nucleus of an atom. The capturing nucleus becomes excited and emits a gamma photon when it relaxes. The nuclei of some atoms have a greater affinity to capture thermal neutrons than other nuclei. Each of these types of interactions may be used to probe characteristics of the formation, such as $CO_2$ saturations. It should be noted that when a neutron generator is bursting (i.e. emitting neutrons), the gamma-rays generated in the external environment will be of type inelastic, epithermal capture, and thermal capture. And when the generator is not bursting, the gamma-rays will be almost pure thermal capture.

One measurement that has been used in the art for monitoring $CO_2$ is the sigma measurement. This approach relies on differentiating $CO_2$ and SW fluids by way of the macroscopic cross section for thermal neutron capture, also called "sigma." The sigma value is determined by measuring the time constant for the thermal neutron capture decay and relating that to sigma via a known equation. The differentiation between $CO_2$ and SW is primarily achieved based on the chlorine content of the water since chlorine has a very high capture cross section while $CO_2$ does not. The sigma can also differentiate between $CO_2$ and oil, but the contrast will not be as good as between $CO_2$ and SW. The differentiation between $CO_2$ and $CH_4$ gas is not good.

The next technique to be discussed is the burst ratio measurement. In this technique, a burst count rate ratio is calculated between two detectors at different spacings from the neutron source. Since the burst ratio is known to be sensitive to the hydrogen index (HI), it can be expected to differentiate a low HI fluid like $CO_2$ (which is actually zero HI) and a high HI fluid like SW. Oil is also high HI, and is similar to SW in this regard. Gas is moderate HI.

Another $CO_2$ detection technique is the capture ratio measurement. In this technique, a capture count rate ratio is determined between two detectors. Since this ratio is also known to be sensitive to HI, it will also differentiate low and high HI fluids like $CO_2$ and SW.

The final prior art technique to be discussed is the inelastic ratio measurement. In this technique, the capture counts are subtracted from the burst counts to determine the inelastic counts. A detector inelastic count rate ratio can then be determined between two detectors. Such a ratio is known to be sensitive to the density of the formation. The differentiation with this technique is thus achieved by density differentiation rather than HI differentiation. It can be expected that $CO_2$ will always be less dense than SW.

A good review of the prior art can be found in the following references: "Characterization of Pulsed Neutron Responses to Monitor CCUS Projects", SPWLA 63$^{rd}$ Annual Logging Symposium, SPWLA-2022-0091, June 2022; "A New Measurement of Evaluation Gas or $CO_2$ in Formation—Fast Neutron Cross Section", The 25th Formation Evaluation Symposium of Japan, SPWLA-JFES-2019-g, September 2019; "Pulsed Neutron Based Monitoring of $CO_2$ in Enhanced Recovery and Sequestration Projects", U.S. Pat. No. 8,471,197, June 2013. While all of these pulsed neutron prior art techniques may be used to monitor $CO_2$, there is a desire to develop further techniques that increase the sensitivity to $CO_2$.

SUMMARY

Disclosed herein is a method of estimating a saturation of carbon dioxide ($CO_2$) in a formation penetrated by a wellbore using a pulsed neutron (PN) tool deployable in the wellbore, wherein the PN tool comprises a source configured to irradiate the formation with fast neutrons, a first detector spaced a first distance from the source, and a second detector spaced a second distance from the source, wherein the second distance is greater than the first distance, and wherein each detector is configured to detect gamma radiation resulting from the irradiating and arriving at the respective detectors, the method comprising: for each of the first and second detectors, receiving neutron capture data indicative of neutron capture photons detected at the respective detectors, determining first detector formation capture counts indicative of neutron capture photons originating from the formation and detected at the first detector, determining second detector borehole capture counts indicative of neutron capture photons originating from the borehole and detected at the second detector, using the first detector formation capture counts and the second detector borehole capture counts to estimate the saturation of $CO_2$ in the formation. According to some embodiments, the method further comprises using the neutron capture data for each of the first and second detectors to determine neutron capture time decay data for each of the detectors. According to some embodiments, determining the first detector formation capture counts comprises decomposing the neutron capture time decay data for the first detector into a formation contribution and a borehole contribution and disregarding the borehole contribution, and determining the second detector borehole capture counts comprises decomposing the neutron capture time decay data for the second detector into a formation contribution and a borehole contribution and disregarding the formation contribution. According to some embodiments, the decomposing of the neutron capture time decay data for the first and second detectors each comprise fitting the neutron capture time decay data received at the respective detectors to dual exponential functions. According to some embodiments, using the first detector formation capture counts and the second detector borehole capture counts to estimate the saturation of $CO_2$ in the formation comprises determining a ratio function of the first detector formation capture counts and the second detector borehole capture counts. According to some embodiments, the ratio function comprises a ratio of the first detector formation capture counts to the second detector borehole capture counts. According to some embodiments, using the first detector formation capture counts and the second detector borehole capture counts to estimate the saturation of $CO_2$ in the formation comprises determining a saturation of a hydrogen containing fluid using the ratio of the first detector formation capture counts to the second detector borehole capture counts. According to some embodiments, the hydrogen containing fluid is one or more of salt water, fresh water, hydrocarbon, and gas. According to some embodiments, determining a saturation of a hydrogen containing fluid comprises calibrating the ratio of the first detector formation capture counts to the second detector borehole capture counts as a function of hydrogen containing fluid saturation using one or more of field data, standard laboratory formation samples, and computer simulations. According to some embodiments, using the first detector formation capture counts and the second detector borehole capture counts to estimate the saturation of $CO_2$ comprises estimating the saturation of $CO_2$ using the formula 1 minus hydrogen containing fluid saturation. According to some embodiments, the method further comprises deploying the PN tool in the wellbore. According to some embodiments, deploying the PN tool in the wellbore comprises conveying the PN tool through the wellbore at a rate of about 2 to about 4 feet per minute. According to some embodiments, deploying the PN tool in the wellbore comprises conveying the PN tool in the wellbore using one or more of a wireline, slickline, coiled tubing and a drill string.

Also disclosed herein is a system for estimating a saturation of carbon dioxide ($CO_2$) in a formation penetrated by a wellbore using a pulsed neutron (PN) tool deployable in the wellbore, wherein the PN tool comprises a source configured to irradiate the formation with fast neutrons, a first detector spaced a first distance from the source, and a second detector spaced a second distance from the source, wherein the second distance is greater than the first distance, and wherein each detector is configured to detect gamma radiation resulting from the irradiating and arriving at the respective detectors, the system comprising: a non-transitory computer readable storage medium comprising instructions, which when executed by a computer configure the computer to perform a method comprising: for each of the first and second detectors, receiving neutron capture data indicative of neutron capture photons detected at the respective detectors, determining first detector formation capture counts indicative of neutron capture photons originating from the formation and detected at the first detector, determining second detector borehole capture counts indicative of neutron capture photons originating from the borehole and detected at the second detector, using the first detector formation capture counts and the second detector borehole capture counts to estimate the saturation of $CO_2$ in the formation. According to some embodiments, the method further comprises: using the neutron capture data for each of the first and second detectors to determine neutron capture time decay data for each of the detectors, determining the first detector formation capture counts comprises decomposing the neutron capture time decay data for the first detector into a formation contribution and a borehole contribution and disregarding the borehole contribution, and determining the second detector borehole capture counts comprises decomposing the neutron capture time decay data for the second detector into a formation contribution and a borehole contribution and disregarding the formation contribution. According to some embodiments, using the first detector formation capture counts and the second detector borehole capture counts to estimate the saturation of $CO_2$ in the formation comprises determining a ratio function of the first detector formation capture counts and the second detector borehole capture counts. According to some embodiments, the first detector formation capture counts and the second detector borehole capture counts to estimate the saturation of $CO_2$ in the formation comprises determining a saturation of a hydrogen containing fluid using the ratio of the first detector formation capture counts to the second detector borehole capture counts. According to some embodiments, the hydrogen containing fluid is one or more of salt water, fresh water, hydrocarbon, and gas. According to some embodiments, determining a saturation of a hydrogen containing fluid comprises calibrating the ratio of the first detector formation capture counts to the second detector borehole capture counts as a function of hydrogen containing fluid saturation using one or more of field data, standard laboratory formation samples, and computer simulations. According to some embodiments, using the first detector formation capture counts and the second detector borehole capture counts to estimate the saturation of $CO_2$ comprises estimating the saturation of $CO_2$ using the formula 1 minus hydrogen containing fluid saturation.

BRIEF DESCRIPTION OF THE DRAWINGS

FIG. 7A shows a technique based on sigma; FIG. 7B shows a technique based on Prox./Long Burst Ratio; FIG. 7C shows a technique based on Prox./Long Inelastic Ratio; FIG. 7D shows a technique based on Prox./Long Capture Ratio; and FIG. 7E shows and embodiment of the disclosed techniques based on Prox. (Form.)/Long (BH) Capture Ratio.

DETAILED DESCRIPTION

Figure 3:
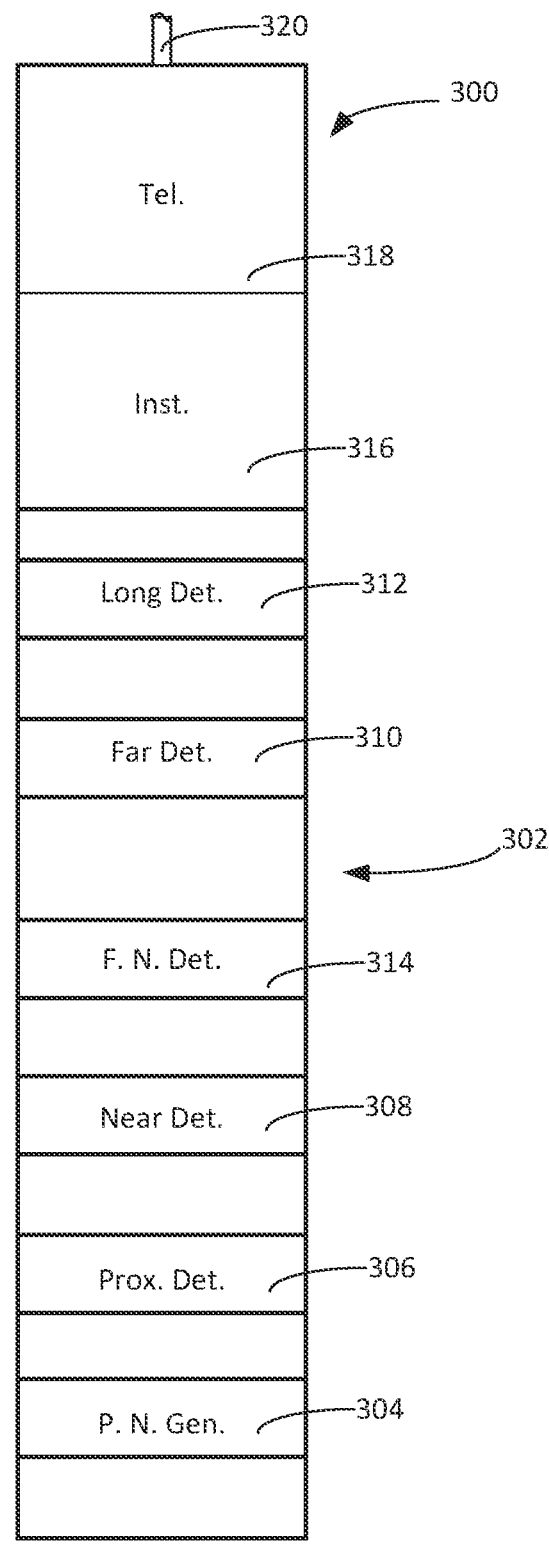
FIG. 3 shows an embodiment of a logging tool according to aspects of the disclosure.

FIG. 3 shows the layout of an embodiment of a pulsed neutron logging tool 300 according to the disclosure. Subsection 302 houses an array of detector assemblies as well as a pulsed neutron generator 304. More specifically, there are four detector assemblies in the illustrated embodiment, each comprising a lanthanum bromide ($LaBr_3$) crystal coupled to a photomultiplier tube and a digital spectrometer for filtering and pulse inspection. These detector assemblies are referred to as the Proximal (Prox) detector assembly 306, the Near detector assembly 308, the Far detector assembly 310, and Long detector assembly 312. These detector assemblies are disposed at increasing axial spacings from the neutron generator 304, as their names imply. According to some embodiments, a fast neutron detector 314 that measures the fast neutron flux may be disposed between the near detector assembly 308 and the far detector assembly. Other embodiments may not include a neutron detector.

It also should be noted that other embodiments of pulsed neutron tools may be used. For example, tools with more or fewer detectors may be used. Generally, the techniques described herein involve gamma detection using a tool that has at least two detectors so that a detector count rate ratio may be calculated. The first gamma detector used to calculate the ratio is close to the neutron generator (typically as close as possible to the neutron generator). For example, the first detector may be less than a foot from the neutron generator target. The second gamma detector used to calculate the ratio is further away from the neutron generator. Typically, it is preferable the that second gamma detector be located as far from the neutron generator as possible while still receiving adequate signal strength (i.e., an adequate count rate). For example, the second detector may be two feet, or preferably more, from the neutron generator. In the context of tool 300, the first gamma detector may be the proximate (Prox) detector 306 and the second detector may be the far (Far) detector 310 or preferably the long (Long) detector 312.

The subsection 302 is operationally connected to an instrument subsection 316. The instrument subsection houses control circuits and power circuits to operate and control the elements of the subsection 302. A telemetry subsection 318 is operationally connected to the instrument section 316. A suitable connector connects the logging tool to a lower end of a preferably multiconductor logging cable 320. The upper end of the logging cable 320 terminates at a draw works, which is well known in the art and is not shown in the illustration. It should be noted that other embodiments of a logging tools are within the scope of the disclosure. For example, the illustrated embodiment is an example of a tool configured to be conveyed into a wellbore via a cable, such as logging cable 320. However, other embodiments may be included as a part or subsection of other conveyed components, for example, as part of a drilling string for LWD/MWD applications. Moreover, although shown embodied in a wireline logging tool, the detector assembly 302 can also be embodied in other borehole instruments. These instruments include pump-down ("memory") instruments conveyed by drilling fluid flow, instruments conveyed by coiled tubing, instruments conveyed by a drill string, and instruments conveyed by a "slick line".

Still referring to FIG. 3, detector assembly response data are telemetered from the tool 300 to the surface of the earth where they are received by an uphole telemetry unit (not shown) typically disposed within surface equipment. These data can be processed in a surface processor (not shown) within the surface equipment to yield a log of one or more parameters of interest. Alternately, data can be partially or completely processed in a downhole processor, for example, within the instrument section 316 and telemetered via the telemetry subsection 318 to the surface equipment. Control parameters can also be telemetered from the surface equipment to the tool 300 via the telemetry system and wireline cable 320.

Figure 4:
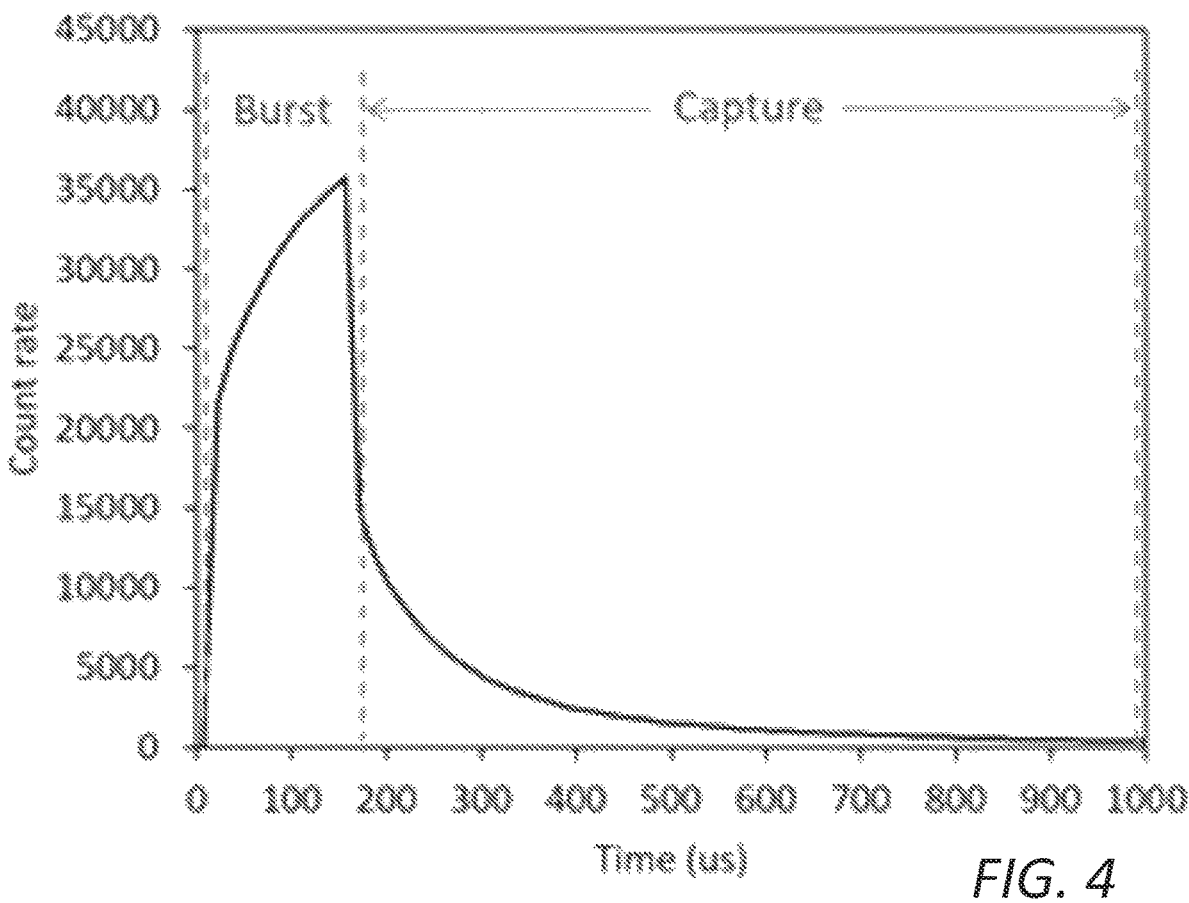
FIG. 4 shows a temporal profile of gamma ray count rate at a detector as determined by MCNP computer simulation.

FIG. 4 shows the temporal profile of the gamma ray (i.e., photon) count rate in one of the detectors (the near detector) as simulated by Monte Carlo radiation transport simulations (using the MCNP code). During the illustrated pulsed neutron simulation, the neutron generator outputs neutrons during a burst lasting about 150 µs, according to some embodiments. During the neutron burst the gamma rays detected include gamma rays generated by inelastic scattering and capture. Once the neutron burst is terminated, the detected gamma signal begins to decay. During this decay period, all detected gamma rays are from capture.

Figure 5:
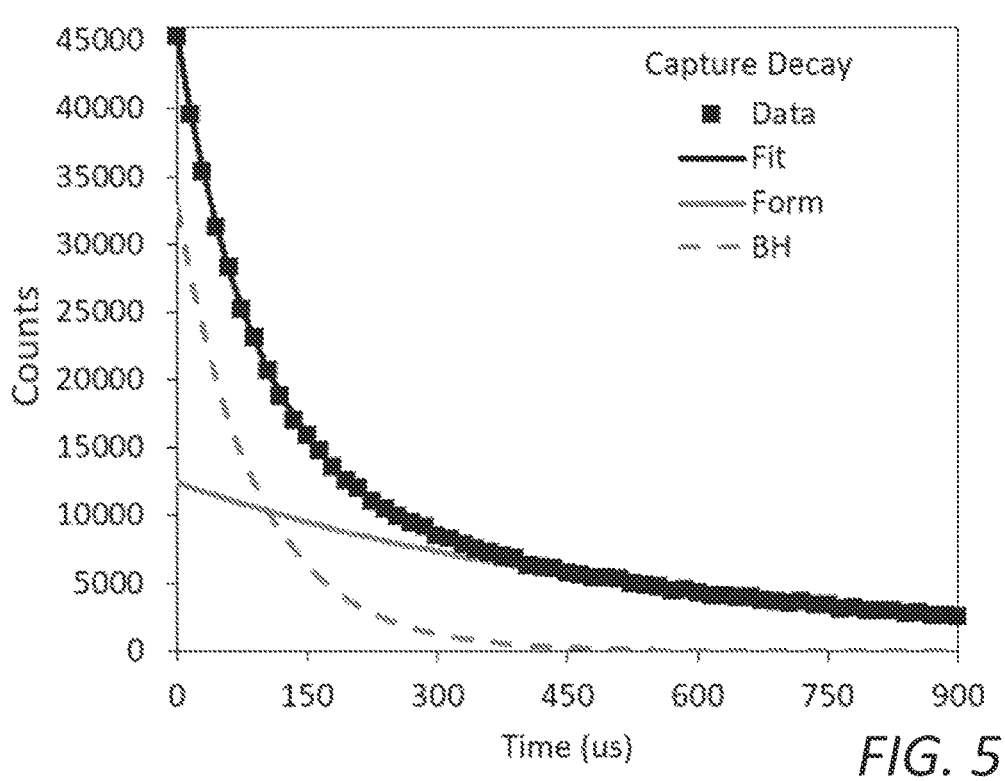
FIG. 5 shows decomposition of MCNP simulated capture time decay counts into borehole and formation contributions.

Aspects of the disclosure involve analyzing thermal capture decay counts detected at multiple detectors. FIG. 5 illustrates capture decay counts detected at a single detector as simulated by MCNP. According to the disclosed embodiments the capture count decay can be decomposed into contributions arising from the formation and from the borehole, as shown in the figure. Methods for decomposing the total capture counts into formation and borehole components are described in U.S. Pat. No. 11,048,015, the entire contents of which are incorporated by reference. Generally, the decomposition is accomplished by fitting the total count decay data to a dual exponential function, wherein one of exponential functions (the slower decay) represents the formation contribution and the other of the exponential functions (the faster decay) represents the borehole contribution. In FIG. 5, the capture decay data is represented as squares, the total fit to the capture decay data by a solid black line, the formation component of the fit is the solid gray line, and the borehole component of the fit is the dashed gray line.

Figure 1:
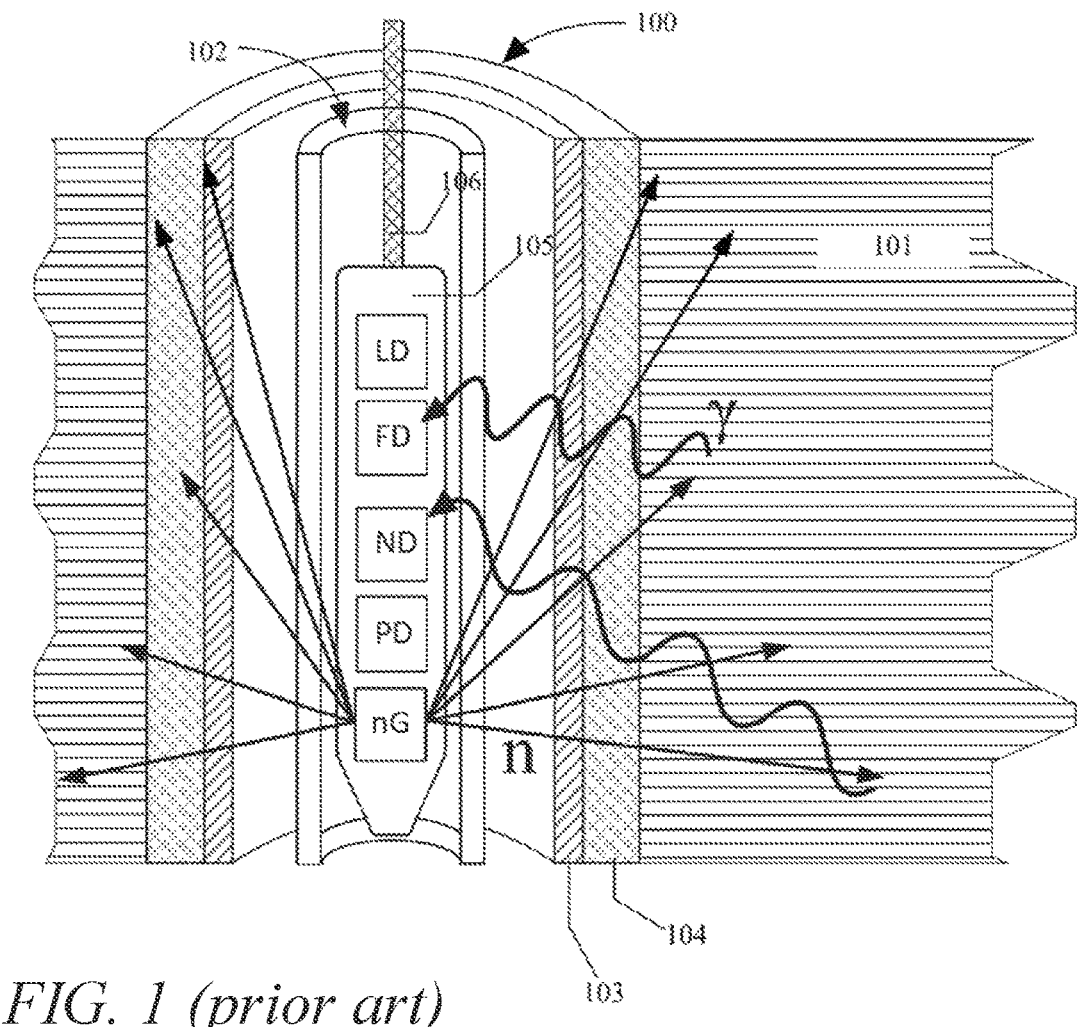
FIG. 1 shows a logging tool according to the prior art.
Figure 2:
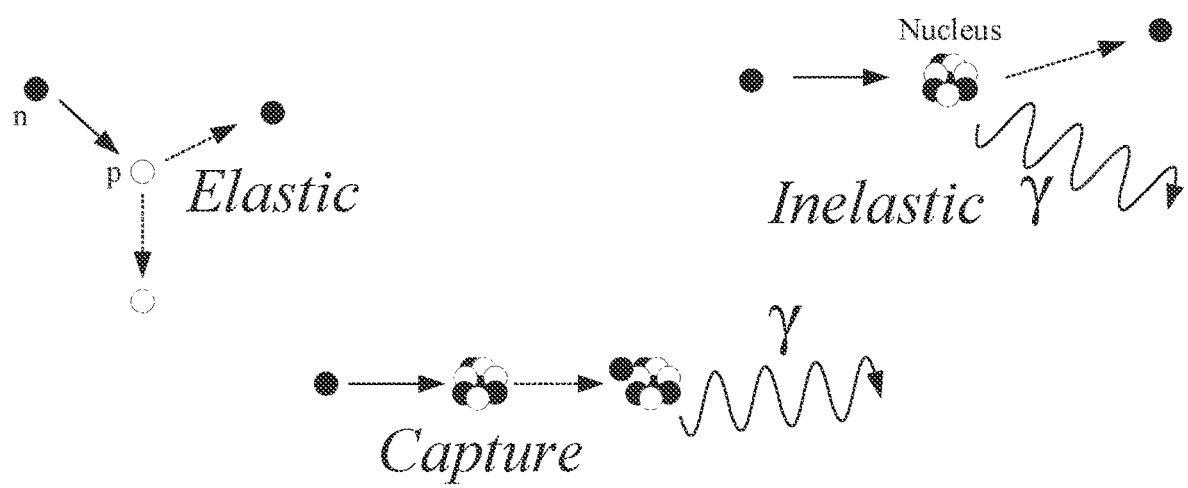
FIG. 2 shows interactions of fast neutrons according to the prior art.
Figure 6:
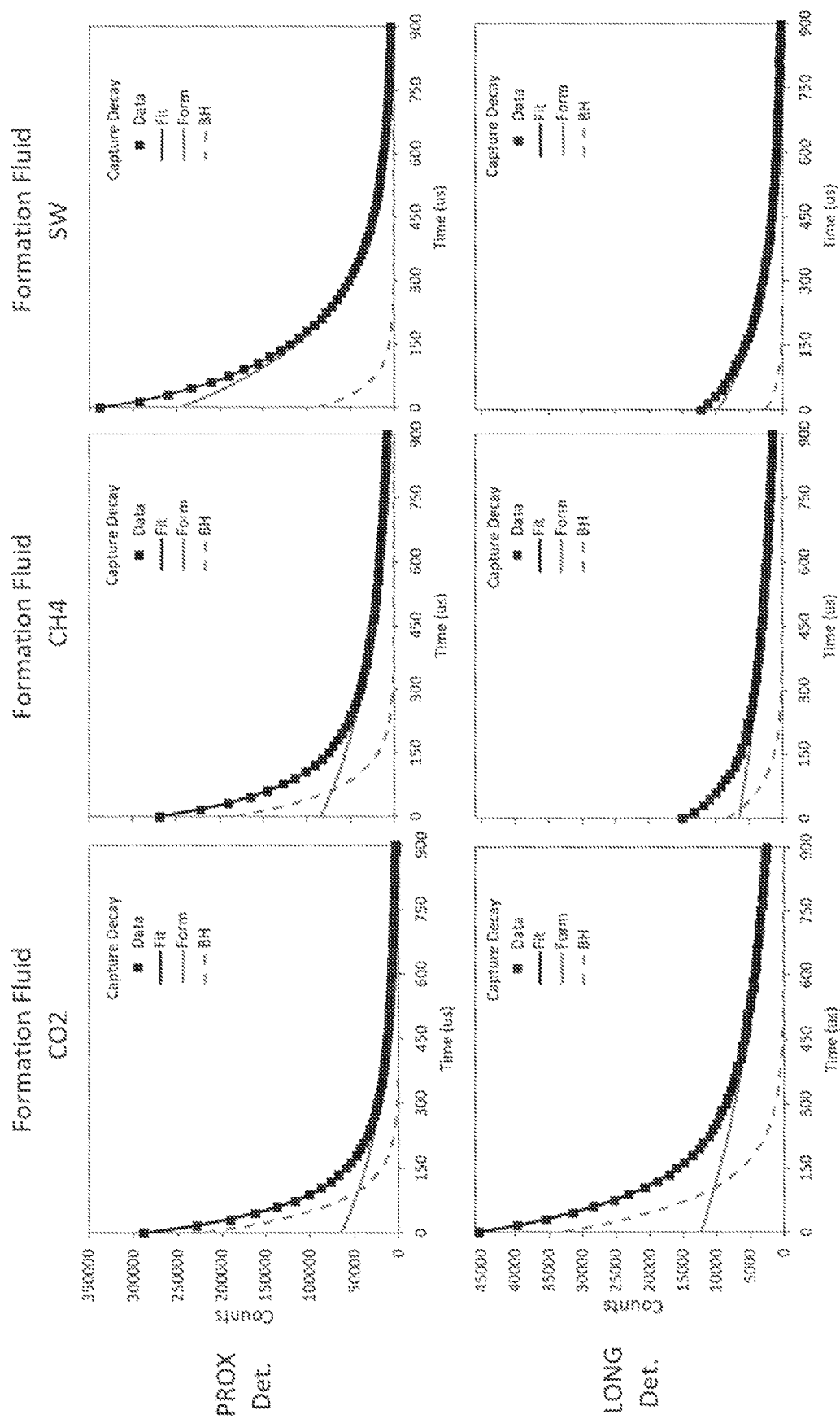
FIG. 6 shows MCNP simulated capture time decay data for the tool in a CCS injector well logging scenario. The rock is 20 p.u. sandstone and 3 different formation fluids are considered: salt water (SW), methane ($CH_4$), and supercritical carbon dioxide ($CO_2$). The borehole fluid is supercritical $CO_2$.

The newly proposed technique for pulsed neutron monitoring of $CO_2$ uses these components to calculate a new ratio: the formation capture counts from a detector close to the generator (e.g. the PROX) divided by the borehole capture counts from a detector far from the generator (e.g. the LONG). It will be shown that this new ratio is more sensitive to (Hydrogen Index) HI than the previous approaches, and is thus more sensitive to the contrast of hydrogen containing formation fluids (like $CH_4$ gas, SW, and oil) to non-hydrogen containing formation fluids like $CO_2$. To illustrate, it is appropriate to consider a specific scenario: Monitoring for $CO_2$ formation fluid from a CCS injector well. The geometry for this injector well scenario follows that of FIG. 1 (although the detector sizes and spacings are those of a specific tool rather than the simple diagram of FIG. 1): The tool is inside a tubing string which is itself inside a cemented casing. The tool is eccentered against the tubing wall. The borehole diameter is 8.5", the casing OD is 7", the tubing OD is 3.5", and the tool OD is 1.69". The casing and tubing fluid are supercritical $CO_2$ with density of 0.6 g/cc. The formation is a 20 p.u. sandstone filled with one of three fluids: Supercritical $CO_2$ with density 0.6 g/cc; $CH_4$ gas with density 0.2 g/cc; or 100 kppm SW with density 1.07 g/cc. A formation fluid of oil is not explicitly calculated here, but should be similar to the SW filled case since the HI for oil is similar to the HI for SW. The results from MCNP simulations for these scenarios are shown in FIG. 6. The first detector considered (the top row of the figure) is the one closest to the neutron generator: the PROX detector. The second detector considered (the bottom row of the figure) is the one furthest from the neutron generator: the LONG detector. The columns of data, left to right, correspond to $CO_2$, $CH_4$ gas, and SW formation fluid respectively. Those fluids correspond to increasing hydrogen content, that is, $CO_2$ has no hydrogen at all, $CH_4$ gas has some hydrogen, and SW has the highest amount of hydrogen. Each of the count rate curves are decomposed into borehole and formation contributions, as described above, with solid lines representing the overall count rate, dashed lines representing the formation contribution, and dotted lines representing the borehole contributions.

The overall count rate at the PROX detector is not particularly sensitive to increasing hydrogen content. But it can be seen from the decomposed curves that the formation component (dotted lines) increases significantly with increasing hydrogen concentration. Accordingly, the formation component of the PROX detector is quite sensitive to increasing hydrogen concentration (i.e., decreasing $CO_2$ concentration, which is inversely proportional to hydrogen concentration).

Notice that the overall count rate at the LONG detector is much more sensitive to the hydrogen content of the fluid than is the count rate of the PROX detector. That is, the overall count rate at the LONG changes more as the hydrogen content increases. Stated differently, the LONG detector in this example is more sensitive to the hydrogen index.

Still looking at the data for the LONG detector, notice that the borehole component (dashed lines) of the count rate is more sensitive to the hydrogen content than the overall count rate. That is, the borehole component decreases more with increasing hydrogen content than does the overall count rate. In sum, at the LONG detector, the borehole component of the capture count rate curve is most sensitive to the increasing hydrogen (and consequently, decreasing concentration of $CO_2$, since $CO_2$ content is inversely related to hydrogen content).

The data illustrated in FIG. 6 may be summed up as follows: the formation component of the PROX detector capture gamma counts increases quickly as a function of increasing hydrogen content (i.e., decreasing $CO_2$ concentration), and the borehole component of the second (long) detector capture gamma counts decreases quickly as a function of increasing hydrogen concentration. These relationships can be combined to yield a function that is particularly sensitive to the hydrogen index of the formation fluid (and therefore, is sensitive to the $CO_2$ concentration which will go up as the hydrogen index goes down). That function is $PROX_{Form}/LONG_{BH}$, where $PROX_{Form}$ is the formation component of the capture gamma counts determined at the detector that is nearer to the neutron generator and $LONG_{BH}$ is the borehole component of the capture gamma counts determined at the detector that is further from the neutron generator.

Figure 7A:
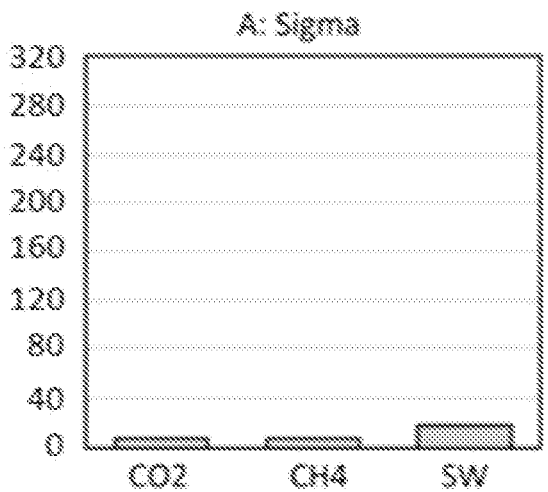
FIGS. 7A-7E show the MCNP results of the CCS injector well logging scenario whereby the various techniques for differentiating salt water, methane, and carbon dioxide are compared.
Figure 7B:
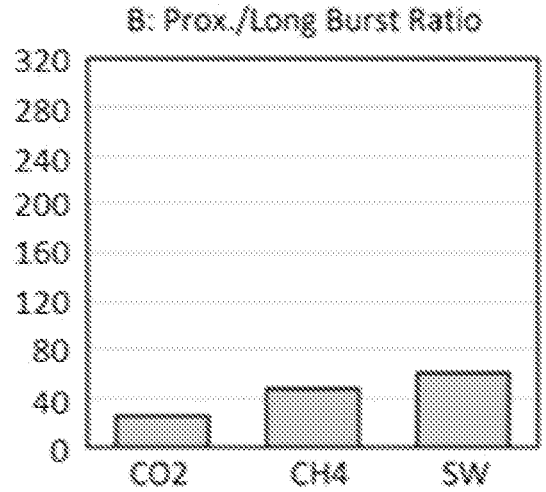
Figure 7C:
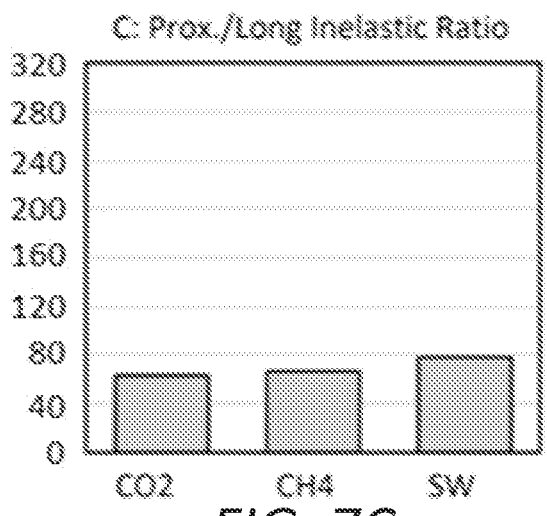
Figure 7D:
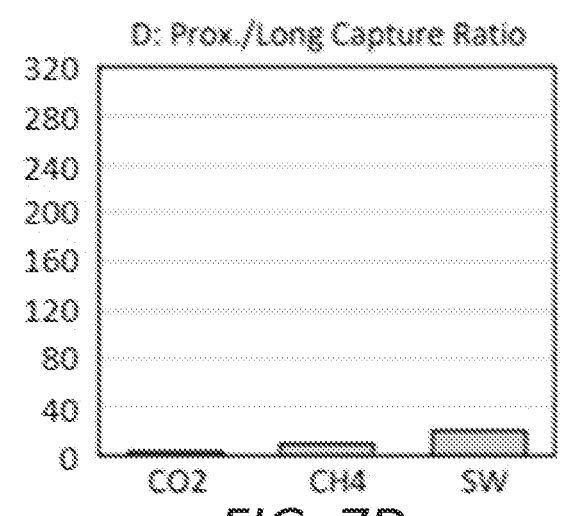
Figure 7E:
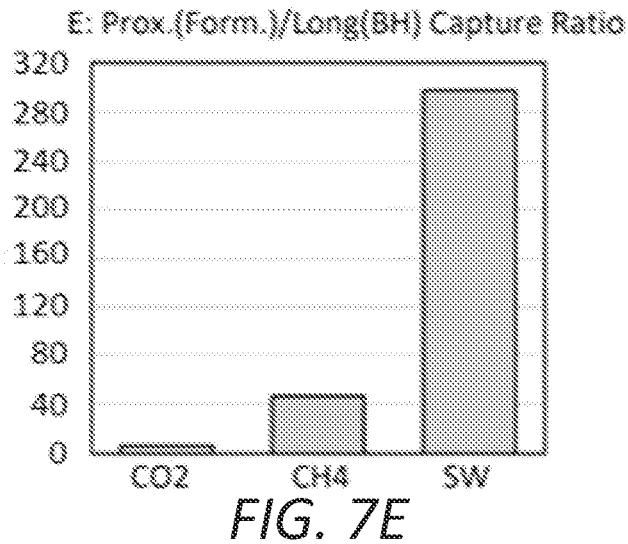

FIGS. 7A-E show a comparison of the new function (FIG. 7E) with other pulsed neutron techniques (FIGS. 7A-E) that are commonly used to monitor for $CO_2$. Each chart compares the values determined for $CO_2$, methane ($CH_4$), and salt water (SW) formation fluids. FIG. 7A is based on the determined sigma value (i.e., the macroscopic cross section for thermal neutron capture in capture units, as explained above). FIG. 7B is the ratio of gamma rays detected at the PROX and LONG detectors during the neutron burst. FIG. 7C is the ratio of inelastic counts at the PROX and LONG detectors. FIG. 7D is the ratio of the overall capture counts detected at the PROX and LONG detectors. FIG. 7E is the new $PROX_{Form}/LONG_{BH}$ capture ratio, as described above. Notice that FIG. 7E, i.e., the presently disclosed technique, provides significantly better sensitivity to increasing hydrogen concentration (and consequently decreasing $CO_2$) than the other techniques. Based upon the results plotted in FIGS. 7A-E, the new $PROX_{Form}/LONG_{BH}$ capture ratio offers better $CO_2$ contrast than the standard historical measurements. In particular, it offers an 8× better contrast with respect to SW and a 3× better contrast with respect to $CH_4$ than the next best option (which is the Prox/Long capture ratio (FIG. 7D)).

Figure 8:
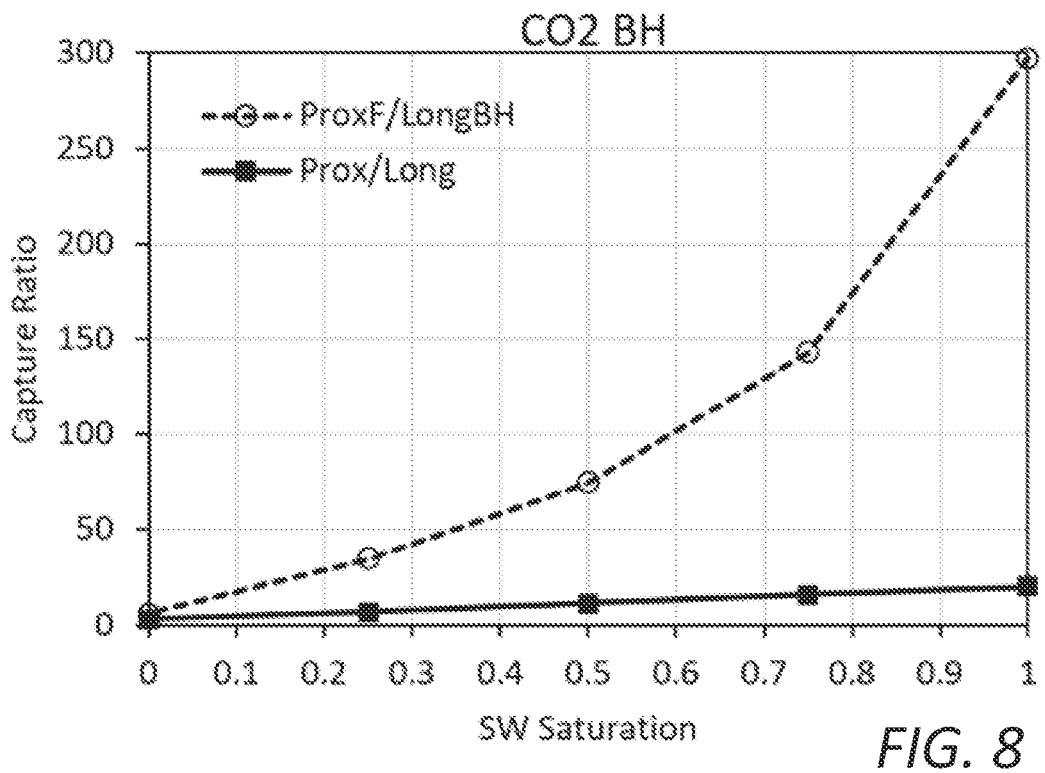
FIG. 8 shows MCNP capture ratios plotted as a function of formation saltwater saturation for the CCS injector well scenario with supercritical carbon dioxide in the borehole. The formation fluid is a mix of saltwater and supercritical $CO_2$.

FIG. 8 shows how the capture ratio varies with the SW saturation in a mixed $CO_2$/SW formation fluid scenario. The large gain in sensitivity for the new $PROX_{Form}/LONG_{BH}$ capture ratio is clearly evident over the next best standard, i.e., the Prox/Long capture ratio, which is shown for comparison. The x-axis of FIG. 8 is the SW saturation, which is related to the $CO_2$ saturation as: $CO_2$ saturation=(1−SW saturation).

Figure 9:
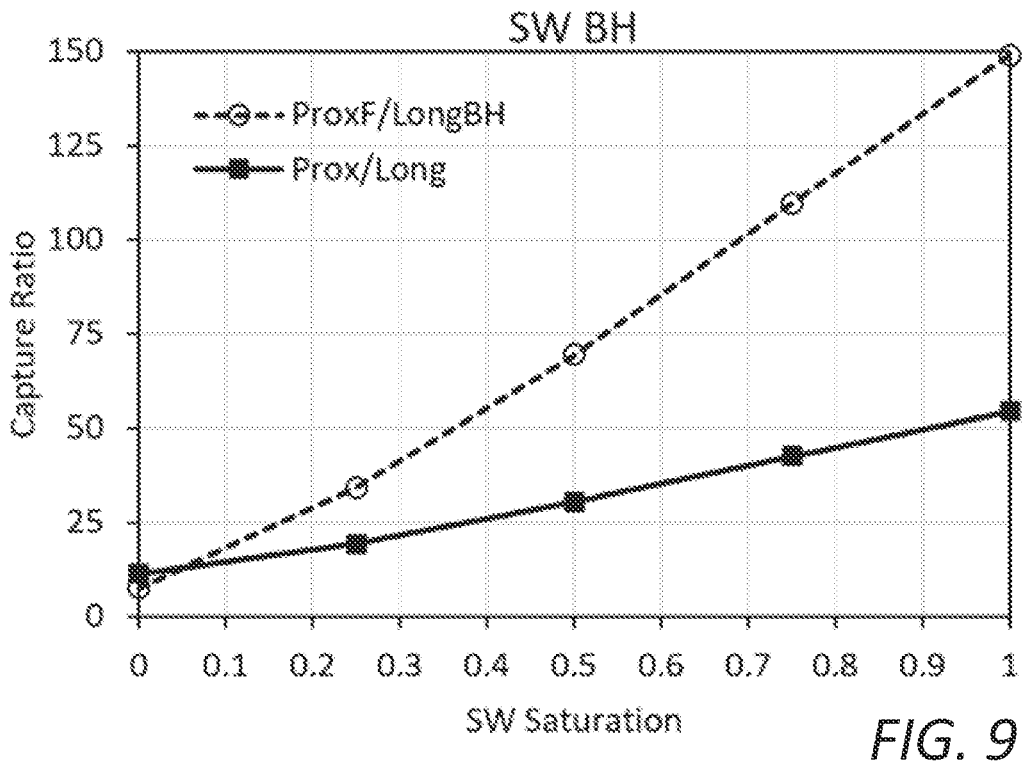
FIG. 9 shows MCNP capture ratios plotted as a function of formation saltwater saturation for the CCS injector well scenario with salt water in the borehole. The formation fluid is a mix of saltwater and supercritical $CO_2$.
Figure 10:
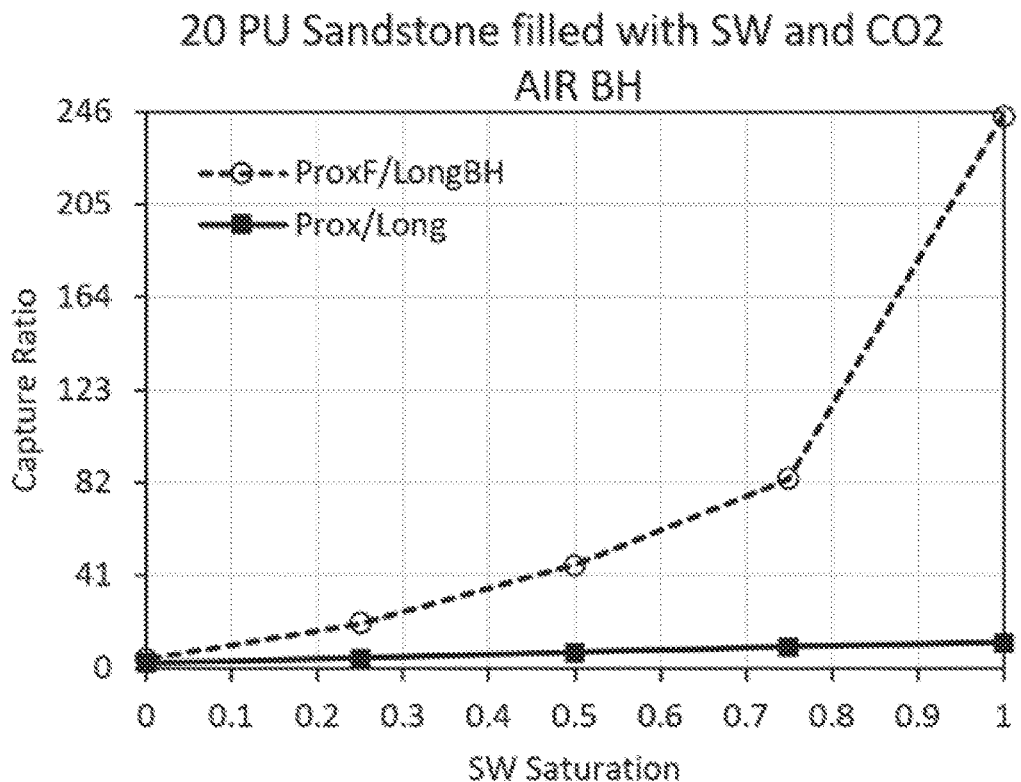
FIG. 10 shows MCNP capture ratios plotted as a function of formation saltwater saturation for the CCS injector well scenario with air in the borehole. The formation fluid is a mix of saltwater and supercritical $CO_2$.

The CCS scenarios discussed so far have assumed that there is $CO_2$ in the borehole. However, other borehole fluids are also possible, for example, those that might be encountered in an observation well instead of an injector well. FIG. 9 shows a saturation plot for a SW filled borehole, and FIG. 10 shows a saturation plot for an air filled borehole. Again, large gains in sensitivity for the new $PROX_{Form}/LONG_{BH}$ capture ratio are evident over the standard Prox/Long capture ratio.

Here we should note that we have chosen to express the new function as $PROX_{Form}/LONG_{BH}$. That function increases as the hydrogen concentration increases. That is why the x-axis of the plots shown in FIGS. 8-10 are expressed in terms of SW saturation. As mentioned above, the $CO_2$ saturation can be determined from the SW saturation plot as $CO_2$ saturation=(1−SW saturation). It will be apparent that the new function could simply be inverted and expressed as $LONG_{BH}/PROX_{Form}$, which is a function that increases as the $CO_2$ saturation increases (and the as the hydrogen concentration decreases). In such a case, the x-axis could be expressed in terms of $CO_2$ saturation directly (instead of SW saturation). Stated more generally, embodiments of the disclosure relate to receiving capture counts at a first detector (PROX) that is close to the neutron generator and at a second detector (LONG) that is further from the neutron generator. For the first detector the counts derived from the formation are retained. For the second detector, the counts derived from the borehole are maintained. Then a ratio of the appropriately retained counts at the two detectors is used to determine either SW saturation or $CO_2$ saturation, as explained here.

Curves, such as those shown in FIGS. 8-10 may be used as calibration curves for logging purposes. We note that the plots shown in FIGS. 8-10 display varying degrees of non-linearity. This is not thought to be a problem, and can be handled by appropriate calibration.

Figure 11:
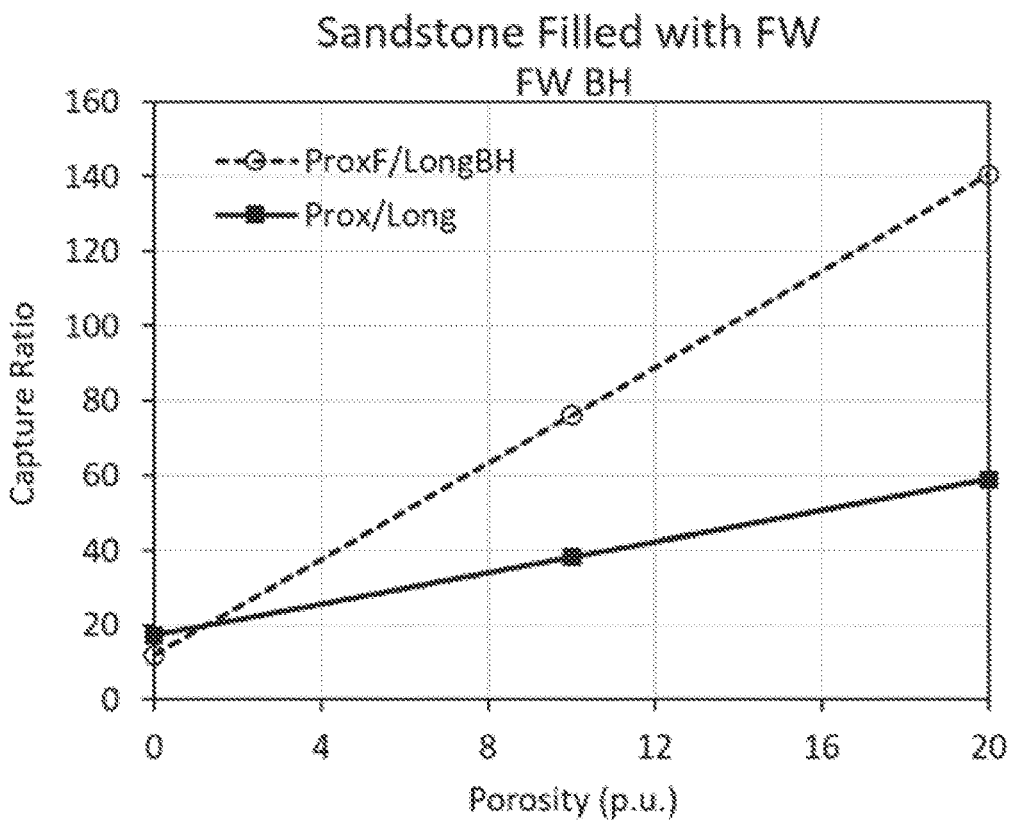
FIG. 11 shows MCNP capture ratios plotted as a function of porosity for a freshwater sandstone formation with fresh water in the borehole.

A fundamental reason for the higher contrast between $CO_2$ and SW using the new ratio is the higher hydrogen index (HI) sensitivity of the new ratio. This can be seen in FIG. 11, which shows a traditional formation porosity vs capture ratio plot. The new $PROX_{Form}/LONG_{BH}$ ratio shows 3× better sensitivity than the historical Prox/Long ratio. As such, the new ratio could be an alternative for the traditional ratio in neutron porosity measurements.

Figure 12:
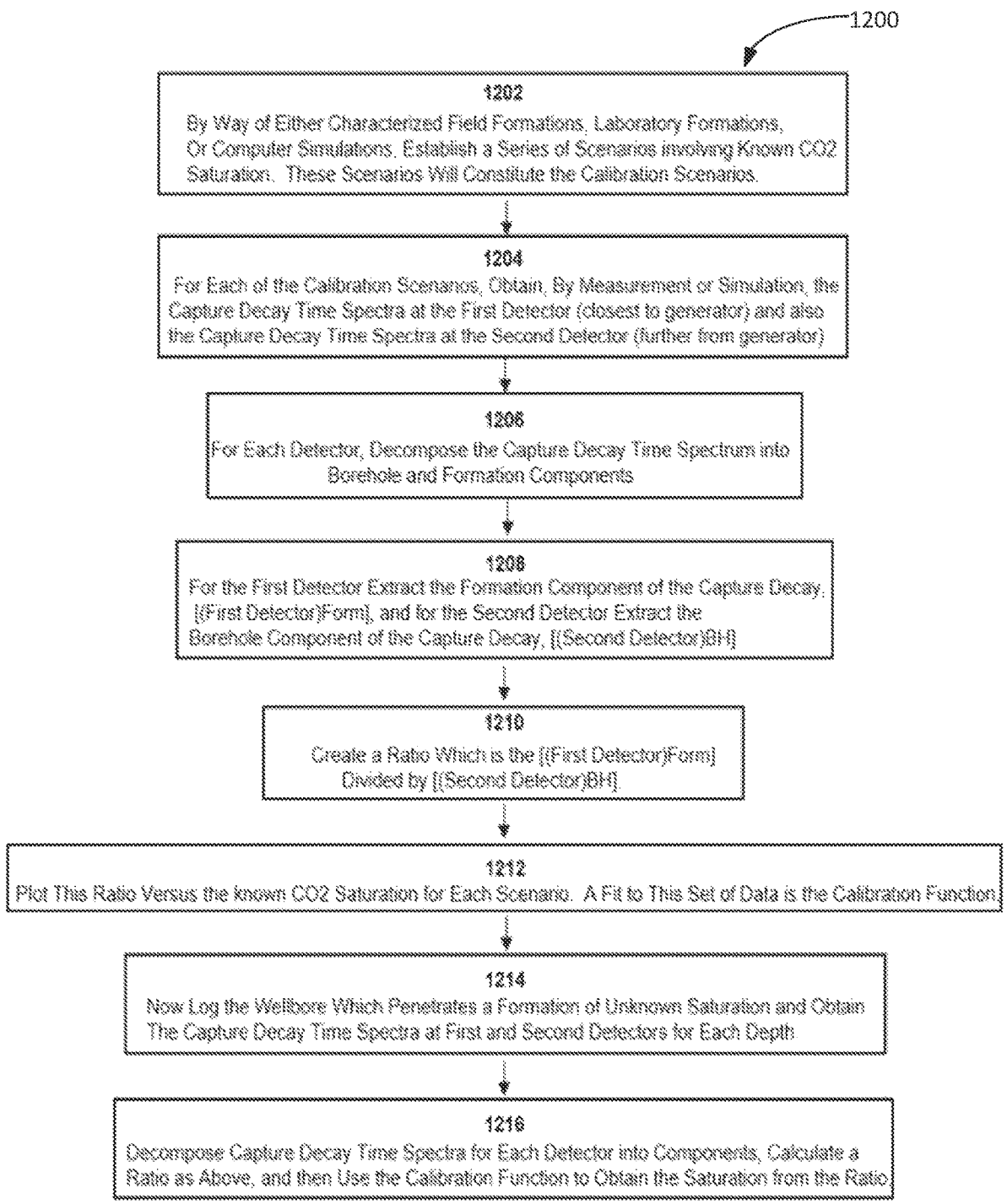
FIG. 12 shows an embodiment of a workflow according to the disclosure.

FIG. 12 illustrates an embodiment of a workflow 1200 for logging $CO_2$ formation fluid saturation. Assume that a tool, such as tool 300 will be used to log the wellbore. Step 1202 is to identify calibration scenarios which have known $CO_2$ saturation levels. The $CO_2$ saturation, in fractional form, is 1-(saturation fraction of $2^{nd}$ fluid), where the $2^{nd}$ fluid is the other fluid present in the formation pores, and is presumably a hydrogen containing fluid (e.g. $CH_4$ gas, SW, oil). Step 1204 is to obtain capture spectra for the first detector, which is closest to the neutron generator (e.g., the PROX detector 306), and for the second detector, which is further from the neutron generator (e.g., LONG detector 312 or the FAR detector 310) in the calibration scenarios by either measurement or simulation. At step 1206 each of the determined capture spectra are decomposed to their formation and borehole contributions. At step 1208, the formation contributions for the first detector (e.g. $PROX_{Form}$) and the borehole contributions for the second detector (e.g. $LONG_{BH}$) are maintained. At step 1210 a ratio is created using these components (e.g. $PROX_{Form}/LONG_{BH}$). In 1212 the ratio is plotted vs $CO_2$ saturation. The resulting fit to this data set (e.g. polynomial fit) is then the calibration function which relates measured ratio to $CO_2$ saturation. The calibration data sets may be similar to the plots shown in FIGS. 8-10. At step 1214, the wellbore may be logged using the tool and the capture spectra may be determined at the first and second detectors. A person of skill in the art will recognize that the logging speed will be tool-dependent. At step 1216, the capture spectra determined during the logging is decomposed and the appropriate ratios are used to determine saturation using the calibration function.

Some portions of the detailed description were presented in terms of processes, methods, programs and workflows. A process or workflow is here, and generally, conceived to be a self-consistent sequence of steps (instructions) contained in memory and run using processing resources to achieve a desired result. The steps are those requiring physical manipulations of physical quantities. Usually, though not necessarily, these quantities take the form of electrical, magnetic or optical signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing," "receiving," "calculating," "determining," "displaying," or the like, refer to the action and processes of a computer system, or similar electronic computing device, that manipulates and transforms data represented as physical (electronic) quantities within the computer system memories or registers or other such information storage, transmission or display devices.

The present disclosure also relates to an apparatus for performing the operations herein. This apparatus may be specially constructed for the required purposes, or it may comprise a general-purpose computer, selectively activated or reconfigured by a computer program stored in the computer. Such a computer program may be stored in a non-transitory computer readable storage medium, which could be, but is not limited to, any type of disk including floppy disks, optical disks, CD-ROMs, a magnetic-optical disks, read-only memories (ROMs), random access memories (RAMs), EPROMS, EEPROMS, magnetic or optical cards, application specific integrated circuits (ASICs), or any type of media suitable for storing electronic instructions, and each coupled to a computer system bus. Furthermore, the computers referred to in the specification may include a single processor, or may be architectures employing multiple processor designs for increased computing capability.

While the invention herein disclosed has been described in terms of specific embodiments and applications thereof, numerous modifications and variations could be made thereto by those skilled in the art without departing from the scope of the invention set forth in the claims.

What is claimed is:

1. A method of estimating a saturation of carbon dioxide ($CO_2$) in a formation penetrated by a wellbore using a pulsed neutron (PN) tool deployable in the wellbore, wherein the PN tool comprises a source configured to irradiate the formation with fast neutrons, a first detector spaced a first distance from the source, and a second detector spaced a second distance from the source, wherein the second distance is greater than the first distance, and wherein each detector is configured to detect gamma radiation resulting from the irradiating and arriving at the respective detectors, the method comprising:
   for each of the first and second detectors, receiving neutron capture data indicative of neutron capture photons detected at the respective detectors,
   determining first detector formation capture counts indicative of neutron capture photons originating from the formation and detected at the first detector,
   determining second detector borehole capture counts indicative of neutron capture photons originating from the borehole and detected at the second detector,
   using the first detector formation capture counts and the second detector borehole capture counts to estimate the saturation of $CO_2$ in the formation.

2. The method of claim 1, further comprising using the neutron capture data for each of the first and second detectors to determine neutron capture time decay data for each of the detectors.

3. The method of claim 2, wherein:
   determining the first detector formation capture counts comprises decomposing the neutron capture time decay data for the first detector into a formation contribution and a borehole contribution and disregarding the borehole contribution, and
   determining the second detector borehole capture counts comprises decomposing the neutron capture time decay data for the second detector into a formation contribution and a borehole contribution and disregarding the formation contribution.

4. The method of claim 3, wherein the decomposing of the neutron capture time decay data for the first and second detectors each comprise fitting the neutron capture time decay data received at the respective detectors to dual exponential functions.

5. The method of claim 1, wherein using the first detector formation capture counts and the second detector borehole capture counts to estimate the saturation of $CO_2$ in the formation comprises determining a ratio function of the first detector formation capture counts and the second detector borehole capture counts.

6. The method of claim 5, wherein the ratio function comprises a ratio of the first detector formation capture counts to the second detector borehole capture counts.

7. The method of claim 6, wherein using the first detector formation capture counts and the second detector borehole capture counts to estimate the saturation of $CO_2$ in the formation comprises determining a saturation of a hydrogen containing fluid using the ratio of the first detector formation capture counts to the second detector borehole capture counts.

8. The method of claim 7, wherein the hydrogen containing fluid is one or more of salt water, fresh water, hydrocarbon, and gas.

9. The method of claim 7, wherein determining a saturation of a hydrogen containing fluid comprises calibrating the ratio of the first detector formation capture counts to the second detector borehole capture counts as a function of hydrogen containing fluid saturation using one or more of field data, standard laboratory formation samples, and computer simulations.

10. The method of claim 7, wherein using the first detector formation capture counts and the second detector borehole capture counts to estimate the saturation of $CO_2$ comprises estimating the saturation of $CO_2$ using the formula 1 minus hydrogen containing fluid saturation.

11. The method of claim 1, further comprising deploying the PN tool in the wellbore.

12. The method of claim 11, wherein deploying the PN tool in the wellbore comprises conveying the PN tool through the wellbore at a rate of about 2 to about 4 feet per minute.

13. The method of claim 11, wherein deploying the PN tool in the wellbore comprises conveying the PN tool in the wellbore using one or more of a wireline, slickline, coiled tubing and a drill string.

14. A system for estimating a saturation of carbon dioxide ($CO_2$) in a formation penetrated by a wellbore using a pulsed neutron (PN) tool deployable in the wellbore, wherein the PN tool comprises a source configured to irradiate the formation with fast neutrons, a first detector spaced a first distance from the source, and a second detector spaced a second distance from the source, wherein the second distance is greater than the first distance, and wherein each detector is configured to detect gamma radiation resulting from the irradiating and arriving at the respective detectors, the system comprising:
   a non-transitory computer readable storage medium comprising instructions, which when executed by a computer configure the computer to perform a method comprising:
   for each of the first and second detectors, receiving neutron capture data indicative of neutron capture photons detected at the respective detectors,
   determining first detector formation capture counts indicative of neutron capture photons originating from the formation and detected at the first detector,
   determining second detector borehole capture counts indicative of neutron capture photons originating from the borehole and detected at the second detector,
   using the first detector formation capture counts and the second detector borehole capture counts to estimate the saturation of $CO_2$ in the formation.

15. The system of claim 14, wherein the method further comprises:
   using the neutron capture data for each of the first and second detectors to determine neutron capture time decay data for each of the detectors,
   determining the first detector formation capture counts comprises decomposing the neutron capture time decay data for the first detector into a formation contribution and a borehole contribution and disregarding the borehole contribution, and
   determining the second detector borehole capture counts comprises decomposing the neutron capture time decay data for the second detector into a formation contribution and a borehole contribution and disregarding the formation contribution.

16. The system of claim 14, wherein using the first detector formation capture counts and the second detector borehole capture counts to estimate the saturation of $CO_2$ in the formation comprises determining a ratio function of the first detector formation capture counts and the second detector borehole capture counts.

17. The system of claim 16, wherein using the first detector formation capture counts and the second detector borehole capture counts to estimate the saturation of $CO_2$ in the formation comprises determining a saturation of a hydrogen containing fluid using the ratio of the first detector formation capture counts to the second detector borehole capture counts.

18. The system of claim 17, wherein the hydrogen containing fluid is one or more of salt water, fresh water, hydrocarbon, and gas.

19. The system of claim 17, wherein determining a saturation of a hydrogen containing fluid comprises calibrating the ratio of the first detector formation capture counts to the second detector borehole capture counts as a function of hydrogen containing fluid saturation using one or more of field data, standard laboratory formation samples, and computer simulations.

20. The system of claim 17, wherein using the first detector formation capture counts and the second detector borehole capture counts to estimate the saturation of $CO_2$ comprises estimating the saturation of $CO_2$ using the formula 1 minus hydrogen containing fluid saturation.

* * * * *